OUTPUT AT SECOND DETECTOR

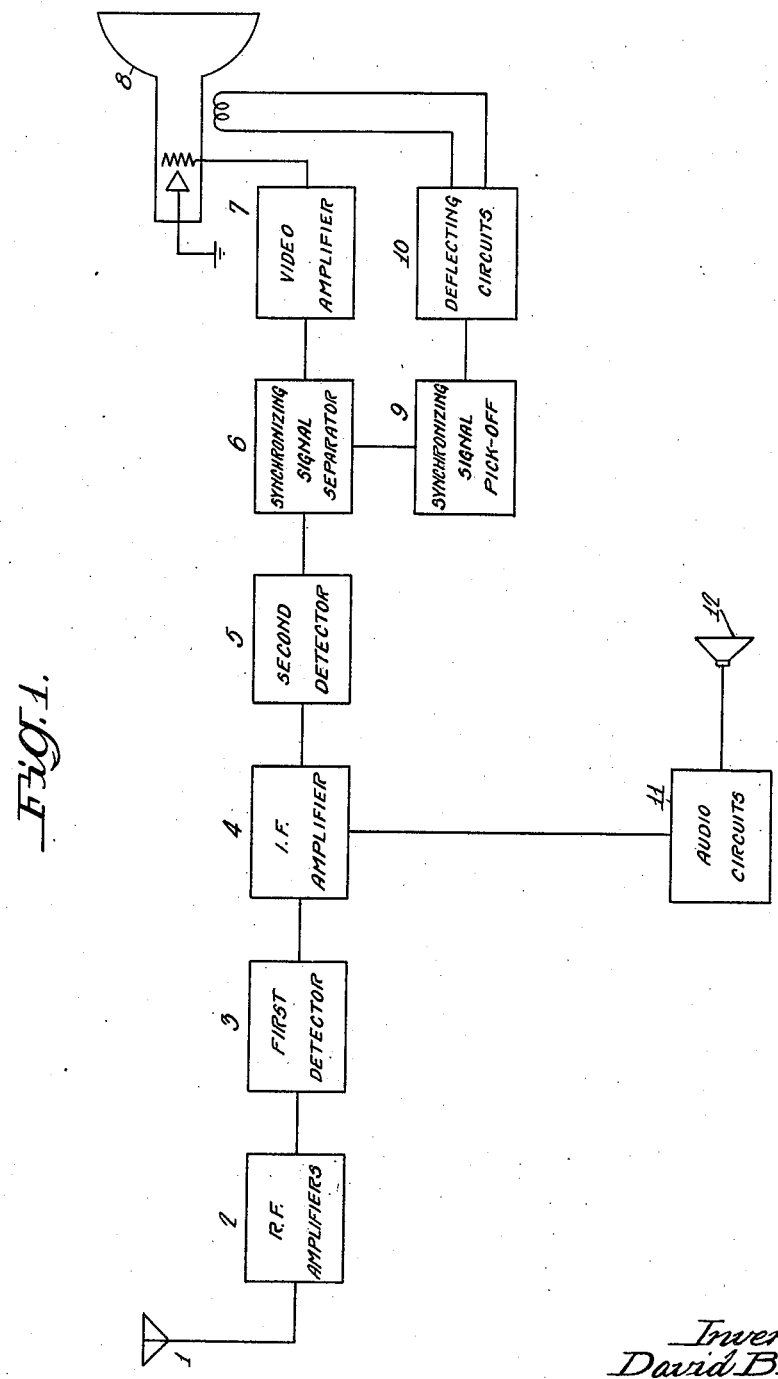

Inventor:—
David B. Smith
by his Attorneys
Howson & Howson

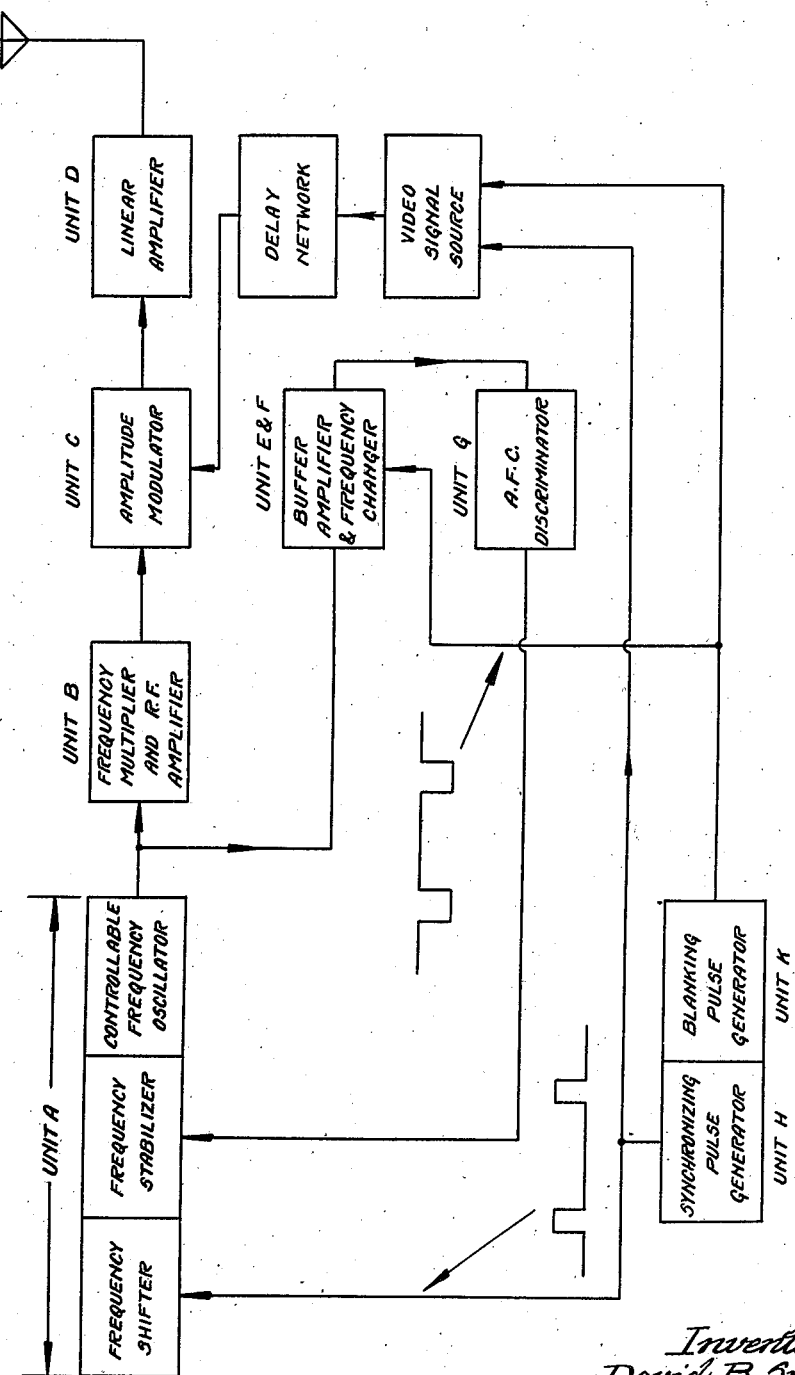

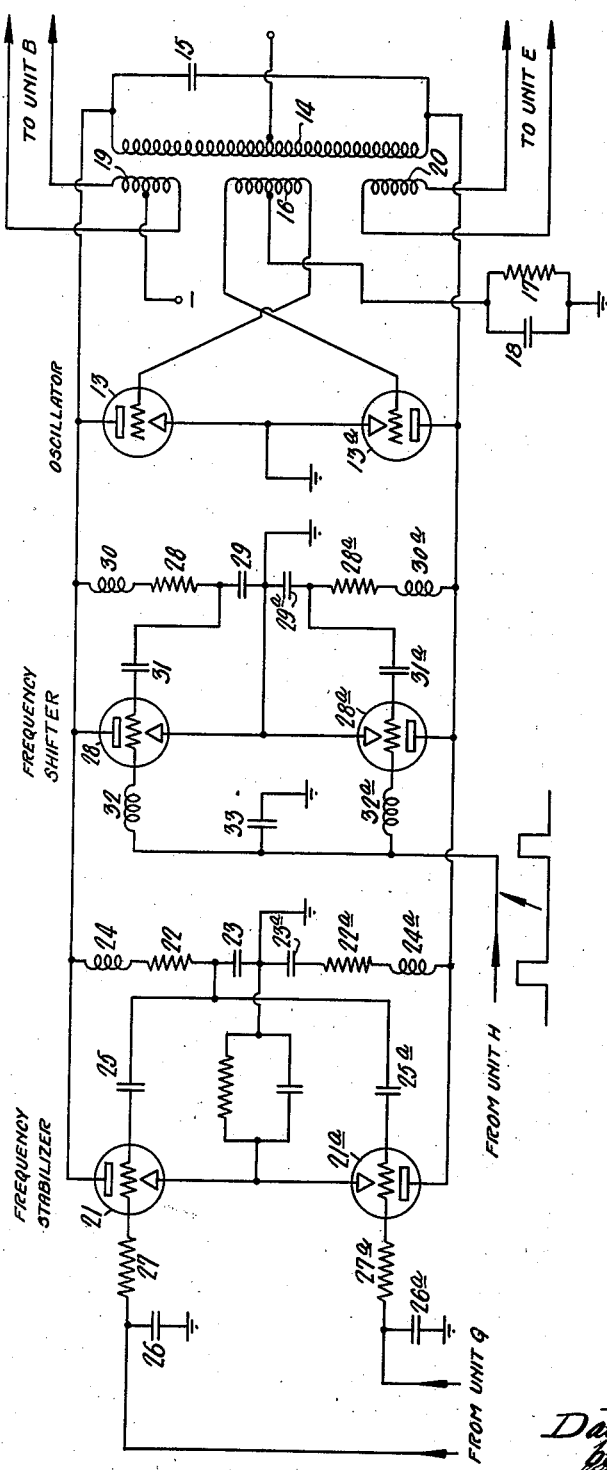

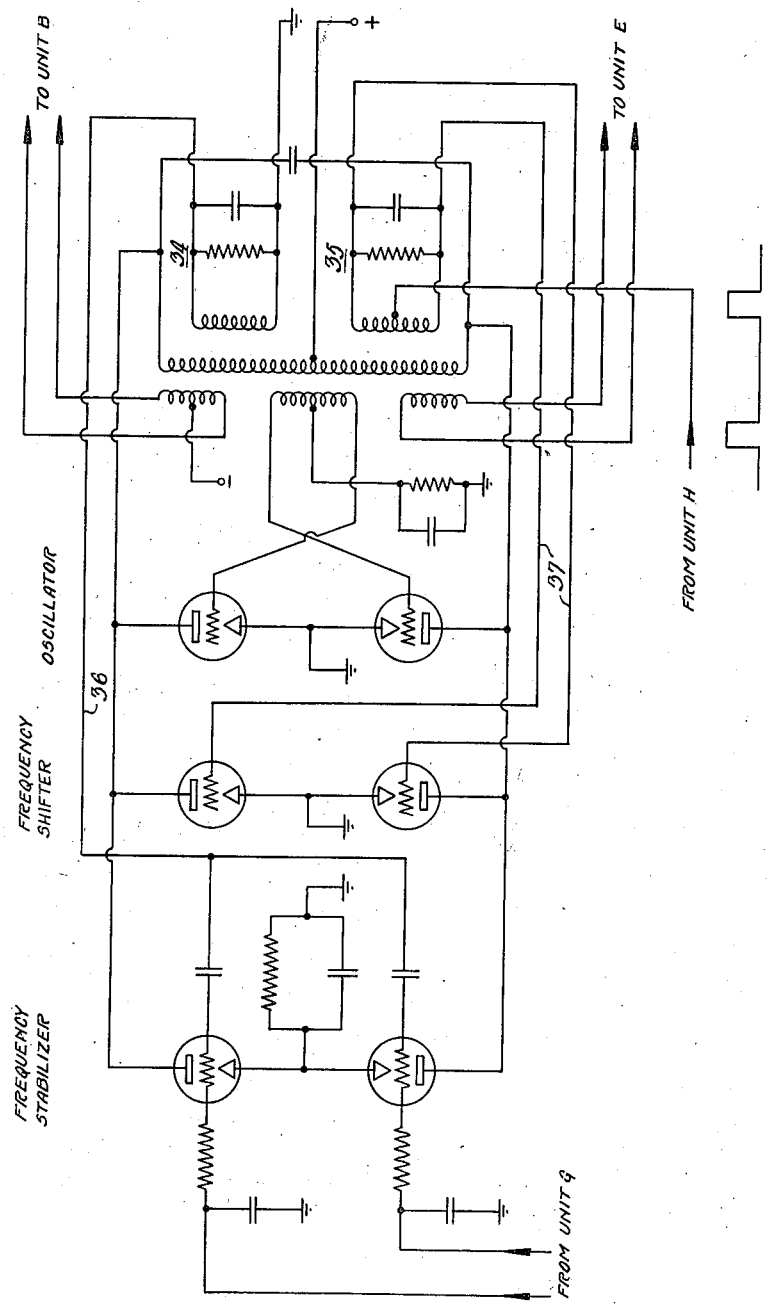

Feb. 9, 1943. D. B. SMITH 2,310,324
MODULATING SYSTEM
Filed July 8, 1941 8 Sheets-Sheet 6
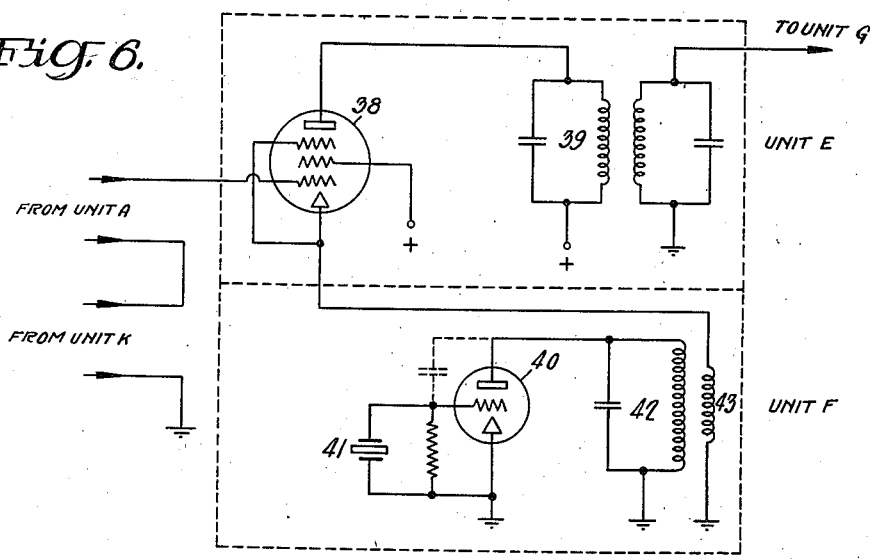
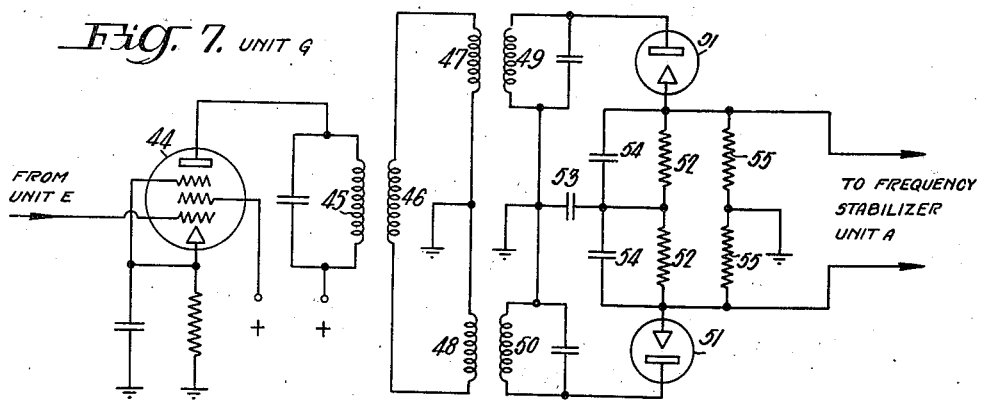
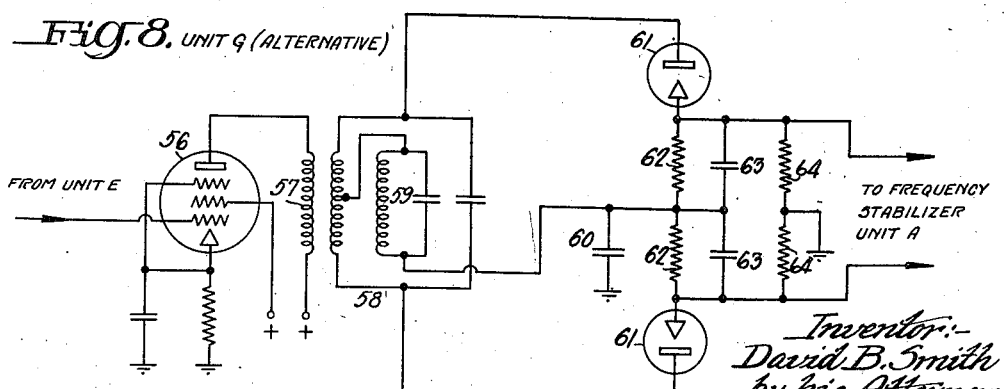
Inventor:-
David B. Smith
by his Attorneys
Howson & Howson

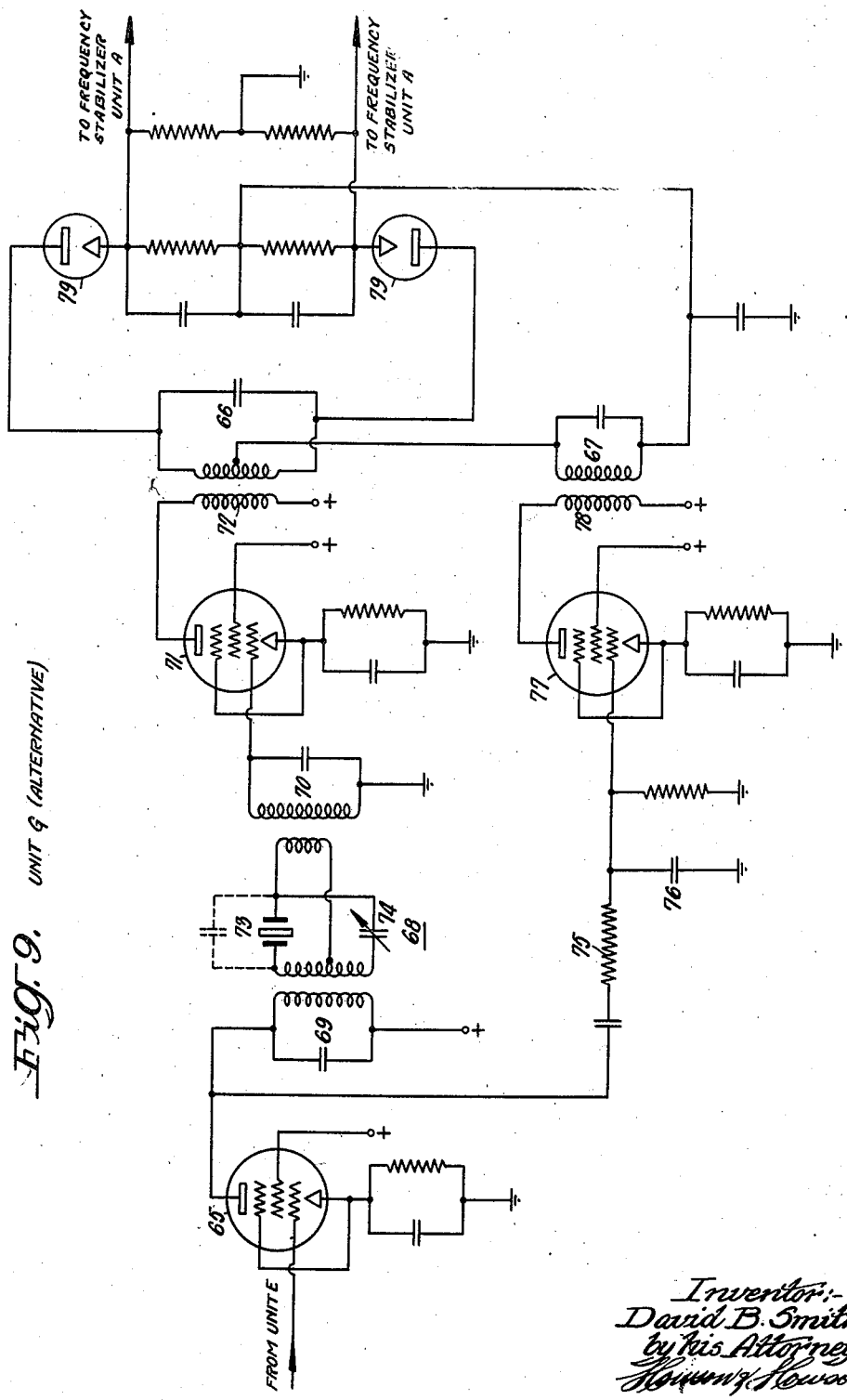

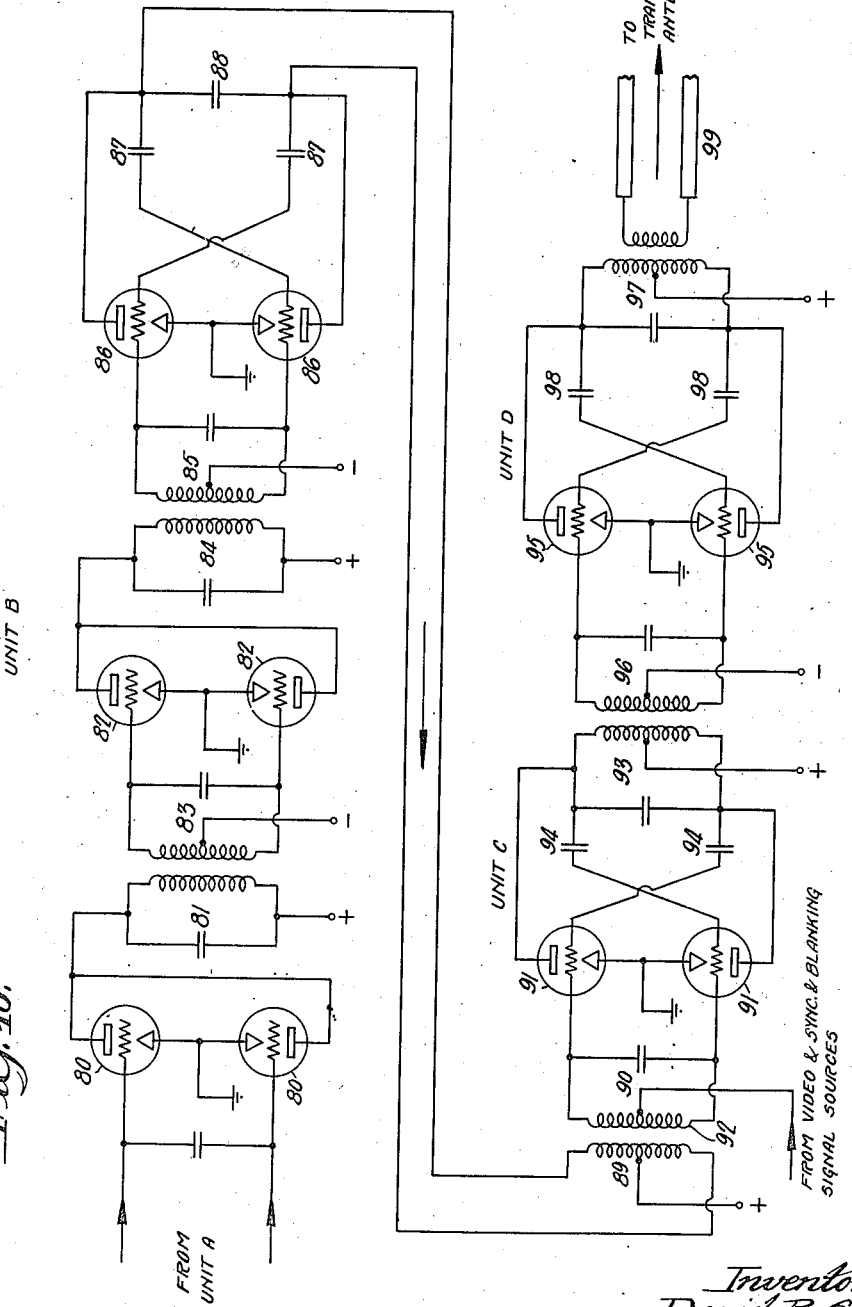

Patented Feb. 9, 1943

2,310,324

UNITED STATES PATENT OFFICE 2,310,324

MODULATING SYSTEM

David B. Smith, Philadelphia, Pa., assignor to Philco Radio and Television Corporation, Philadelphia, Pa., a corporation of Delaware Application July 8, 1941, Serial No. 401,494

21 Claims. (Cl. 178—7.2)

This invention relates to an electrical system and method for the modulation of high frequency electric waves, such, for example, as those within the range of frequencies commonly used in modulated carrier wave transmission of audio and video intelligence. As will be explained hereinafter, the system is particularly adapted to be used in generating a modulated carrier wave of a particular form adapted to convey the intelligence necessary to be transmitted in television, which comprises the video intelligence and the synchronizing intelligence, as is well known in the art.

In the past it has been customary to transmit the video and synchronizing signal components of the composite television signal by causing them to amplitude-modulate the same carrier. It is customary to do this in such a manner that the two components can readily be separated one from the other in order that they may perform their respective functions at the receiver. This has generally been done by dividing the time axis of the carrier wave signal into regularly spaced intervals of alternatively long and short duration. During the long intervals the carrier wave is modulated by the video signal, and during the shorter intervals by synchronizing signal. In order to permit amplitude separation of the video and synchronizing signals, it is customary to establish these signals at relatively different amplitude levels. Usually from 20 to 25% of the overall carrier amplitude is reserved for the synchronizing component.

Recently there has been suggested (Electronics, Feb. 1940, pp. 27-30, Article by A. V. Loughren) an improved form of signal for transmitting the video and synchronizing intelligence which effectively increases the amplitude of the synchronizing signal relative to the video signal, and thus improves the relative synchronizing signal to noise ratio, without detracting from the amplitude of the video signal. In some respects the signal employed in the present invention is similar to that described by Loughren. The video and synchronizing intelligence is segregated into alternative long and short time intervals along the time axis of the signal as it is transmitted. During the long intervals the video signal is caused to amplitude-modulate the carrier wave in accordance with the aforementioned practice. During the short interval, however, the synchronizing intelligence is made to shift the carrier wave and simultaneously to increase the amplitude level of the shifted carrier with respect to the blanking level of the video signal. Consequently, we may regard the present system as one employing two carrier waves, the video carrier and the synchronizing carrier. As will be pointed out hereinafter, the gain vs. carrier frequency characteristic of the television receiver enables synchronizing signals so transmitted to be received in a highly favorable manner.

Although there are important advantages to be realized from the use of the new form of signal, which will be pointed out hereinafter, considerable difficulty has been experienced in developing satisfactory means for generating the signal. Accordingly, it is an object of the present invention to provide a complete system for generating the said signal and for surmounting these difficulties.

One requirement of the system is that it should be capable of generating a carrier signal which is maintained substantially constant in frequency during the periodically recurring intervals during which it is to be amplitude-modulated by the video signal, and whose frequency is shifted from this constant value by a certain predetermined amount during portions of the intervals during which the synchronizing signal is transmitted. Hence, more specifically it is an object of the invention to provide an oscillator or generator of electrical oscillations, incorporating means for automatically maintaining the frequency of the oscillator output substantially constant during the periodically recurring intervals during which the said output is to be amplitude-modulated by the video signal, and means for shifting the frequency of the oscillator output by a predetermined amount during portions of the intervals separating said first intervals.

Since, in such a system, the automatic means for maintaining the frequency of the carrier constant during the first-mentioned intervals would, unless prevented, tend likewise to maintain the carrier frequency constant during the intervals in which it is desired to shift the carrier frequency, means should also be provided to render the first-mentioned means inoperative during the last-mentioned intervals. Accordingly, another object of the invention is to provide such means.

Furthermore, since it is desired that the means provided for shifting the frequency of the carrier during the aforementioned intervals should not exercise any undesired influence upon the carrier frequency during the intervals in which the carrier frequency is to be maintained constant, it is another object of the invention to provide in the system a frequency shifting or changing device responsive to changes in the instantaneous magnitude of a control signal and which is operative to cause a shift in the carrier frequency when the magnitude of the control signal exceeds a certain value but which is inoperative to cause any change in the carrier frequency until such value is exceeded.

Other objects and advantages of the invention will be apparent from the following description and the accompanying drawings in which:

Fig. 1 is a block diagram of a conventional television receiver.

Fig. 3 is a block diagram of a system constructed in accordance with the invention for generating the new type of signal as above described;

Fig. 4 is a diagrammatic illustration of an oscillator and means for controlling the frequency at which it oscillates in accordance with the purpose of the invention. This apparatus is designated "Unit A" and corresponds to "Unit A" in the block diagram of Fig. 3;

Fig. 5 is a similar illustration of an alternative form of oscillator and means for controlling the frequency at which it oscillates which, likewise, corresponds to "Unit A" of Fig. 3;

Fig. 6 illustrates a buffer amplifier and heterodyne frequency-changing stage, together with its cooperating oscillator which are designated, respectively, as Units E and F, and correspond, respectively, to those units in the block diagram of Fig. 3;

Fig. 7 illustrates an automatic frequency control discriminator adapted to develop a control voltage to be applied to Unit A to maintain the carrier frequency substantially constant. This device is designated "Unit G," and corresponds to "Unit G" in the block diagram of Fig. 3;

Figs. 8 and 9 illustrate alternative forms of discriminator units which may be used as "Unit G" in the system of Fig. 3; and Fig. 10 illustrates a radio frequency amplifier and frequency multiplier, Unit B; a modulator, Unit C; and a linear radio frequency power amplifier, Unit D which may be used in the system of Fig. 3.

Figure 2A:
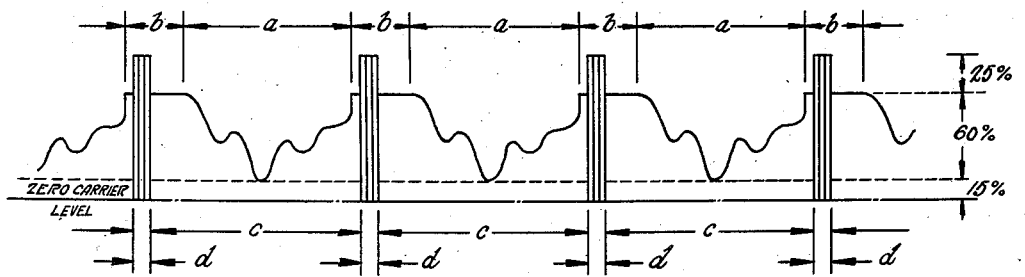
Fig. 2 illustrates the improved form of signal above described and the advantages thereof.

The present invention may best be understood by first considering in greater detail the new type of signal and its reception by a receiver. Although a special receiver may be employed, having particular adaptation for separating the video and synchronizing components of the signal, the signal may be efficiently received by a conventional receiver, such as shown in Fig. 1, commonly employed to receive the purely amplitude-modulated signal used in the past. Not only is such a conventional receiver adapted to receive the new signal, but, when supplied therewith, it will operate more satisfactorily than with the old form of purely amplitude-modulated signal. The reason for this will now be set forth with reference to Figs. 1 and 2.

Referring first to Fig. 1, the conventional receiver there shown comprises a signal-collecting antenna 1, a radio frequency amplifier 2, a first detector 3, an intermediate frequency amplifier 4, a second detector 5, a synchronizing signal separating stage 6, a video signal amplifier 7, and a visual reconstituting device or picture tube 8. In general, the synchronizing signal pick-off stage 9 which derives signal from stage 6 may comprise a tube whose bias is so controlled that it selects only that portion of the composite signal which exceeds the so-called blanking level, which portion comprises synchronizing pulses of the known type. These pulses are utilized to control the deflecting circuits 10 which generate sawtooth wave forms of the well known type for accomplishing the deflection of an electron beam in the picture tube 8. As in the usual television receiver, the audio modulated carrier signal may be amplified in the radio frequency amplifier 2; its frequency may be translated in the first detector 3 and it may be fed from the output of the said detector or from a point in the intermediate frequency amplifier 4 to the audio frequency circuits 11 which may include an intermediate frequency amplifier, a second detector, and an audio amplifier from which signal is supplied to the sound reproducing device 12.

Figure 2B:
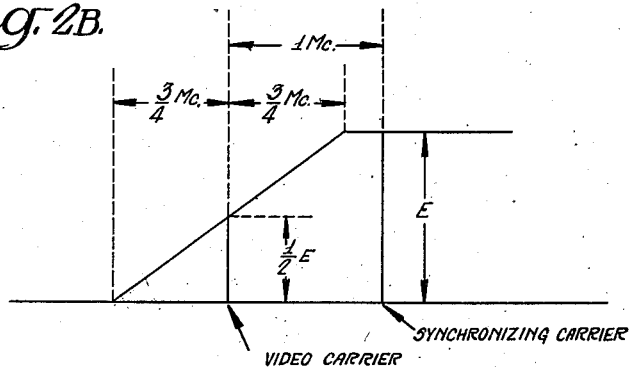
Figure 2C:
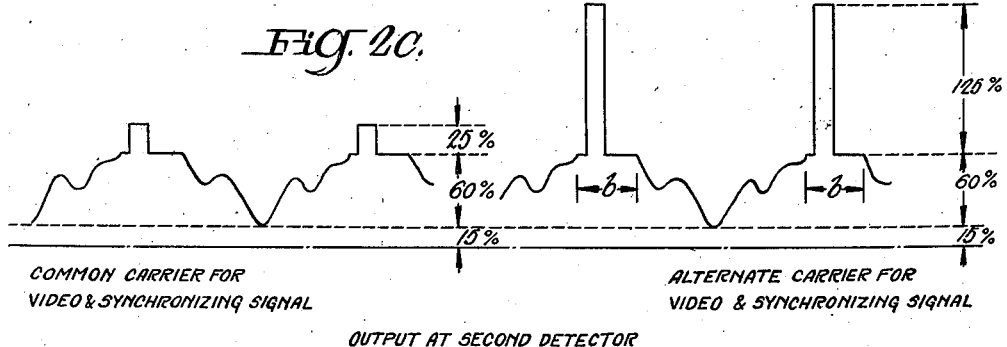

The manner in which the conventional receiver of Fig. 1 operates when supplied with the new type of signal may best be understood by reference to Figs. 2—A, 2—B and 2—C. This signal is shown in Fig. 2—A, only the portion above the zero carrier level being illustrated since the signal is symmetrical with respect thereto. During the intervals $c$ the frequency of the carrier wave is maintained at a substantially constant value which will hereafter be referred to as the "video carrier frequency." During the shorter intervals $d$, the frequency of the carrier wave is shifted to a different value which may be either higher or lower than the carrier frequency. This frequency will hereafter be referred to as the "synchronizing carrier frequency." In a signal adapted to be received by a conventional television receiver, the synchronizing carrier frequency may, for example, be located approximately one megacycle above the carrier frequency. During the intervals $a$, which in general may be slightly shorter than the intervals $c$, the video carrier is amplitude-modulated by means of the signal containing the video intelligence. During the portions of intervals, $b$, preceding and succeeding the intervals $d$, the video carrier is preferably established at a substantially constant amplitude. Preferably, the amplitude of the synchronizing signal of interval $d$ is increased appreciably, say by 20%, over the amplitude of the blanking level of interval $b$, as illustrated. The object to be achieved in making the intervals $d$, during which the synchronizing carrier is transmitted, of shorter duration than the intervals $b$ is to prevent interaction between the video modulated carrier and the synchronizing carrier.

For purposes of simplifying the explanation of the invention, the exemplary signal shown in Fig. 2—A has been used. However, it should be understood that this is not the only specific form of signal which can be generated. For instance, the intervals $a$ during which amplitude-modulation of the video carrier obtains, the intervals $b$ separating the intervals $a$, and the intervals $d$ during which the carrier frequency is shifted to the predetermined frequency may all be varied in duration. Furthermore, the respective intervals need not all be of the same duration, nor need the frequency of the carrier be changed to the same extent in every interval $d$. In fact, in forming a television signal of this type, it will generally be desirable to establish the synchronizing carrier 15,750 times per second (for 525 line, 30 frame, interlaced television) to effect horizontal synchronization, while further establishing the said carrier 60 times per second to effect vertical synchronization. In order that the horizontal synchronizing intelligence may be separated from the vertical, it is possible to make the intervals during which the 60 cycle signals occur longer than those during which the 15,750 cycle signals occur. To avoid interference between the two, the longer intervals may be serrated to provide for horizontal synchronization during the vertical synchronizing intervals in the same manner as is done when the synchronizing signals are caused to modulate the amplitude of the single carrier wave in the prior form of signal. The manner in which this may be effected by means of the apparatus hereinafter to be described will be fully understood following a perusal of this specification and in view of the prior art. Thus, it will be recognized that in the signal represented in Fig. 2—A, the intervals b may be the horizontal synchronizing intervals. Assuming this to be the case, the respective durations of the intervals a, b, and d (for the case of 525 line, 30 frame, interlaced television) might be approximately as follows:

$a = 55$ microseconds
$b = 9$ microseconds
$d = 5$ microseconds

It will, of course, be understood that Fig. 2—A does not purport to show the longer duration vertical synchronizing intervals.

In Fig. 2—B there is represented approximately the standard frequency response characteristic of those stages preceding the second detector in a standard television receiver, such as that shown in Fig. 1. In order to equalize the percentage modulation of the side band components in the vicinity of the carrier, the realized response is made substantially uniform down to a point approximately 0.75 megacycle above carrier from which point it decreases substantially uniformly to zero at a point approximately 0.75 megacycle below carrier. Thus, the response at carrier frequency will be approximately 50% of maximum. As is well known to those skilled in the art, such a response characteristic serves to restore to their proper relative amplitudes the side band components whose amplitudes are distorted in the course of transmission by the so-called vestigial sideband method. Such a response characteristic is of decided assistance in the utilization of the new type of signal under discussion for reasons which will appear presently.

When the signal of the type shown in Fig. 2—A is applied to a receiver with a response characteristic of the type shown in Fig. 2—B, the response to the carrier frequency during the intervals c will, as shown in Fig. 2—B, be equal to ½ E, where E is the maximum response. However, during the intervals d when the synchronizing carrier is established, operation will be upon the upper and level portion of the frequency response curve, so that the response to the synchronizing carrier will be equal to E or twice the response to the video carrier. Of course, in order for this to be the case, the video carrier frequency must be shifted to such an extent as to cause operation upon the upper part of the response curve. In the case shown in Fig. 2—B, where the response begins to fall off at a point 0.75 megacycle above carrier, it will be sufficient to shift the carrier frequency upward by approximately 1 megacycle.

The advantages to be gained by utilizing this improved form of transmitted signal will be apparent from a comparison of the detected signals obtained at the second detector when the old and new signals are used. The two signals are shown, respectively, to scale at the left and at the right in Fig. 2—C. Both signals may be thought of as resulting from the detection of carrier waves having the amplitude relations of Fig. 2—A. The signal to the left, however, results from the reception of a carrier wave in which both video and synchronizing signals are applied to the same carrier. The signal to the right, the new signal, results when the video and synchronizing signals are transmitted by means of separate or alternate carriers. In the case of the old signal, it is customary that about 25% of the amplitude of the signal be occupied by the synchronizing component. This will leave approximately 75% less 10 or 15% available for the video signal since, due to limitations in the capabilities of modulating equipment, it is generally difficult to obtain more than about that much picture modulation.

In the signal obtained by the new method, the amplitude of the video signal may be maintained at its previous value of about 75% of peak carrier, but by the establishment of a new synchronizing signal carrier at a frequency for which the receiver gain is double that of the video carrier (see Fig. 2—B) the detector output for the synchronizing signal will be double that obtained in the case of the old signal, as illustrated in Fig. 2—C. On the basis of the percentages shown for the left-hand signal of these drawings, the new synchronizing signal amplitude will be 125% of the original peak carrier. Thus, while the peak detected synchronizing signal for the new system is twice that of the old system, the new system yields a synchronizing signal pulse which is five times as great as that obtained in the old system, i. e. 125% as compared with 25%. This voltage gain of five times is equivalent to what could only be obtained, under the old system, by a transmitter power increase of twenty-five times. Obviously, the new system will enable the receiver to be maintained in synchronism with weak signals, or through strong interference, much more reliably than was the case in the old system. Actual field tests which were carried out to compare the two systems under various conditions of noise and signal strength satisfactorily bear out these theoretically determined advantages.

Referring now to Fig. 3, which shows in block form the complete system for generating the new signal, it will be noted that Unit A constitutes the prime source of radio frequency energy and this unit comprises three sub-units. The one on the right is an oscillator which actually generates wave energy. The other two sub-units are control units which tend to alter the frequency of the oscillator by varying the reactance of its tank circuit. In this respect they are quite similar in operation to ordinary automatic frequency control tubes. However, the action of the frequency shifter sub-unit differs from that of an ordinary A. F. C. control tube, as will be pointed out hereinafter. The action of the frequency stabilizer unit is substantially the same as that of the usual A. F. C. control tube.

Referring again to Fig. 2—A, the purpose of the frequency stabilizer is to maintain the oscillator frequency at a substantially constant value, say 16,812,500 cycles, during the intervals c. Accordingly, the output of the oscillator may be supplied through the buffer amplifier and frequency changer, Units E and F, to the A. F. C. discriminator, Unit G, which develops a frequency controlling voltage which is applied to the frequency stabilizer of Unit A to maintain the oscillator frequency substantially constant. It is desired that Unit G should be rendered inoperative to develop a controlling voltage during the intervals $d$ when the carrier frequency is shifted. Accordingly, there are applied to the buffer amplifier E from a suitable source, Unit K, blanking pulses of duration equal to that of the intervals $b$ in such a way as to prevent signal from the oscillator from reaching the discriminator during these intervals. Shortly after the discriminator has thus been rendered inoperative, the frequency shifter sub-unit which is inoperative at all other times, is rendered operative, to shift the frequency of the controllable oscillator by an appreciable amount, say 250 kilocycles, thus providing what has been referred to hereinbefore as an alternate, or synchronizing signal carrier. This frequency shift is effected by means of synchronizing pulses of duration equal to the intervals $d$ applied to the frequency shifter from a suitable source, Unit H. In general, of course, there should be an interconnection between Units H and K so that the synchronizing pulses may be accurately timed with respect to the blanking pulses and so that the system may operate in the manner above set forth. It will be clear that the output signal from Unit A will be of substantially constant amplitude, but its frequency will shift from that of the video carrier to that of the synchronizing carrier between successive intervals. In the Unit B, this signal may be amplified and multiplied in frequency up to the desired value of undeviated carrier (for example, 67.25 megacycles). Following this, it may be amplitude-modulated in the Unit C during the intervals designated $a$ in Fig. 2. The modulator may be followed by a linear power amplifier (Unit D) from which the modulated and deviated carrier is supplied to the antenna for transmission.

With the general organization and operation of the system in mind, reference may now be made to Figs. 4 to 10 which illustrate in detail the preferred forms of the various components of the system. Referring first to Fig. 4, an important feature of the invention is the use of an oscillator, the frequency of which can readily be changed by varying the reactance of the elements comprising its tank circuit. Any of the well-known feedback oscillator circuits may be used with the limitation, however, that one should preferably be used whose frequency of oscillation depends principally upon the resonant frequency of its tank circuit and is not controlled by some external device such as a piezoelectric crystal. For example, in the circuit of Fig. 4, the oscillator comprises a pair of push-pull connected triode space discharge devices 13 and 13a whose anodes are connected to opposite ends of a tank circuit comprising the inductance 14 and the condenser 15. Feedback is obtained through the coil 16 inductively associated with the tank inductance 14 and connected between the grids of the tubes 13 and 13a. Suitable bias for the oscillator tubes may be developed across the bias resistor 17 by-passed by the condenser 18, and plate voltage may be supplied to the tubes through a center-tap connection made to the inductance 14. Inductive coupling means 19 and 20 are provided for coupling the oscillator tank circuit to Units B and E, respectively.

The frequency stabilizer sub-unit of Unit A comprises the variable mutual conductance space discharge devices 21 and 21a connected so as to constitute a push-pull automatic frequency controlling circuit as disclosed in U. S. Patent No. 2,240,428 issued April 29, 1941, to Charles Travis. The plates of these tubes are connected, respectively, to the opposite ends of the oscillator tank circuit, whereby each is supplied with voltage of the oscillator frequency in the opposite phase from that supplied to the other. Also connected between the plates of the tubes 21 and 21a is a phase-shifting network comprising essentially the resistors 22 and 22a and condensers 23 and 23a. There may also be included in series with these elements the inductors 24 and 24a of relatively low inductance for tuning out the effective grid-plate capacities of the tubes 21 and 21a. At the oscillator frequency, the reactance of the condensers 23 and 23a should be small by comparison with the resistance in series with them in order that the current in the phase-shifting network will be substantially in phase with the voltage thereacross. The voltage of oscillator frequency developed across the condenser 23 and measured with reference to the potential of the point of connection between condensers 23 and 23a will lag by approximately 90° the voltage across the phase-shifting network which is of the same phase as that on the plate of tube 21 and opposite in phase to that on the plate of tube 21a. This voltage is applied to the grids of both of the tubes 21 and 21a through condensers 25 and 25a so that the two grids are excited in phase, but the voltage of oscillator frequency on the grid of tube 21 lags the voltage on its plate, while the voltage on the grid of tube 21a leads that on its plate. In consequence of such excitation, the current in the tube 21 will lag its plate voltage and cause it to simulate a positive reactance, while the current in the tube 21a will lead its plate voltage and cause it to simulate a negative reactance.

The magnitudes of the reactances will, as is well known, depend upon the mutual conductances of the tubes, which in turn will depend upon the D. C. potentials of their respective grids. As the D. C. voltage on the grid of tube 21 is made more positive, the magnitude of the positive reactance simulated by the tube 21 increases, as will the magnitude of the negative reactance of the tube 21a when its D. C. grid voltage is made more positive. If the tubes are identical in their characteristics, equal D. C. voltages applied to the grids of both should cause them to simulate respectively equal positive and negative reactances so that the net reactance appearing between the plates of the tubes will be zero. If D. C. voltages varying in opposite senses are applied to the grids of the respective tubes, the magnitude of one reactance will increase, while that of the other decreases. Thus, the reactance appearing between the plates of the two tubes may be made to vary from a positive value through zero to a negative value, and vice versa, by applying out-of-phase varying D. C. control voltages to their grids. Out-of-phase D. C. control voltages are derived in the present instance from the A. F. C. discriminator Unit G and are adapted to vary the reactance presented by the tubes 21 and 21a connected across the tank circuit 14—15 of the oscillator in a manner to maintain the frequency of the oscillator substantially constant. It will be noted that resistance-capacitance filters comprising the condensers 26 and 26a and the resistors 27 and 27a are included in each of the connections from the A. F. C. discriminator Unit G to the grids of the tubes 21 and 21a. It may now be mentioned, and the reason therefor will appear more clearly hereinafter, that the time constants of these filters should be large by comparison with the intervals during which the oscillator frequency is deviated.

It should be understood that although the frequency stabilizer described and shown is a push-pull device comprising two control tubes, it is quite possible to employ for the same purpose a single-side device employing but a single control tube, as will be apparent to those skilled in the art. However, since the push-pull arrangement possesses certain very definite advantages, as set forth in the aforementioned Travis patent, it has been employed in the system of the present invention.

The frequency shifter sub-unit of Unit A comprises the variable mutual conductance space discharge devices 28 and 28a with their cathodes connected together and their plates connected to opposite ends of the tank circuit of the oscillator. The function of the shifter is to produce, during the portions d of the intervals b when the carrier signal is not to be modulated in amplitude by the video signal, a sudden and substantial shift of the carrier frequency in the manner already described. In order for this to be effected, the frequency shifter tubes must produce a sudden decrease in the inductance of the tank circuit 14—15 which in the present instance is obtained by increasing their simulated inductance which is effectively in shunt with the tank circuit. As in the case of the tubes in the frequency stabilizer sub-unit, the plate of each of the tubes 28 and 28a is supplied, by reason of its being connected to one end of the oscillator tank circuit, with voltage of oscillator frequency opposite in phase to that supplied to the other plate. A phase-shifting unit, similar to the one for the A. F. C. control tubes and comprising the resistors 28 and 28a, the condensers 29 and 29a, and also the inductors 30 and 30a for the purpose aforementioned, may be connected between the anodes of the tubes 28 and 28a, or alternatively voltage for exciting the grids of the tubes 28 and 28a may be obtained from the same phase shifter which excites the grids of the A. F. C. control tubes. However, in the case of the frequency shifter, the grids are excited out-of-phase with each other by connections made to both sides of the phase shifter through condensers 31 and 31a. Thus, the excitation on the grid of each tube lags the voltage on its plate so that both tubes will simulate positive reactances. During the intervals c, as designated in Fig. 2, both tubes 28 and 28a are biased to cut off, but during the intervals d they are rendered active by positive polarity synchronizing pulses derived from Unit H and applied to both grids through the radio frequency choke coils 32 and 32a. A by-pass condenser 33 may also be provided to prevent feedback of the radio frequency grid excitation into Unit H. The increase in the positive reactance of both tubes which obtains during the occurrence of each synchronizing pulse decreases the effective series inductance of the tank circuit and thereby increases the frequency of the oscillator during these intervals.

It will be noted that the frequency shifter circuit differs from the frequency stabilizer circuit in that the grids of the former are excited out-of-phase and control bias voltage is supplied to them in phase, whereas in the latter mentioned circuit the conditions are reversed. This is a very important feature of the frequency shifter which especially suits it to the performance of its particular function. In the frequency shifter, there is desired a device which may be cut-off for all values of bias voltage below a certain value, but which exercises an increasing amount of control as the bias voltage increases above this value. The connection of the circuit in the manner just described yields such a device. The A. F. C. control circuit, on the other hand, is not adapted to perform this particular function. It is a continually variable controlling device which contributes to the reactance of the tank circuit except for certain critical values of bias voltage applied to its grid. Although such behavior is desirable in an A. F. C. control circuit, it is not desirable in the frequency shifter since it would require that the grids of the control tubes be maintained at the critical voltages aforementioned during the time intervals when the carrier is to be maintained constant for the transmission of the video portion of the signal. In the frequency shifter as described, this is not the case. It is merely necessary to maintain the bias voltages on both grids at a value below that which produces cut-off. By reason of this mode of operation, the frequency shifter circuit is particularly adapted to perform the function required of it. However, it will be understood that although the frequency shifter shown and described is a balanced system employing two control tubes, a single side system employing but a single control tube might be used. The balanced system has the advantage that it avoids unbalancing of the oscillator which would obtain with a single side system.

In Fig. 5 there is shown an alternative form of Unit A embodying a different circuit for exciting the grids of the frequency stabilizer and frequency shifter tubes. The rest of the unit is identical with that shown in Fig. 4 and need not be explained in detail. Here the phase shifting circuits comprise a pair of resonant circuits 34 and 35 inductively coupled to the oscillator tank circuit. These circuits should preferably be tuned to a frequency in the neighborhood of the video carrier. In order that the phase-shift shall not vary appreciably as the oscillator frequency changes, the tuning of the resonant circuits should be rather broad. It may even be desirable to provide additional damping by means of resistors shunting the circuits as shown in the figure. In-phase excitation for the grids of the frequency stabilizer tubes is obtained through the connection 36 made to the top of the resonant circuit 34. The lower end of this circuit is grounded as shown. Push-pull excitation for the grids of the frequency shifter tubes is obtained through connections 37 to opposite ends of the resonant circuit 35. It will be noted that synchronizing pulses from Unit H are supplied through a center tap on the inductance of the resonant circuit to the grids of the frequency shifter tubes for changing the reactance presented by the tubes to effect the desired deviation. Obviously, this form of phase shifter will be superior at high frequencies to that employing a serially connected resistor and condenser, since in the latter the phase shift will be affected by the distributed shunt capacity inherent in the resistor.

A further possible modification in the frequency stabilizer which may well be mentioned here consists in exciting the grids of the stabilizer tubes in opposite phase in the same manner as the frequency shifter tubes. However, in order to obtain the required differential change in the reactances of the stabilizer tubes, it is necessary to supply in-phase D. C. controlling voltages to the grids of the stabilizer tubes. It will, of course, be understood that the circuits of the frequency stabilizer and of the frequency shifter herein shown and described may be subjected to considerable variation with respect to the details of their construction and that there is no intention to restrict the scope of the invention to the use of the specific forms of these devices here shown.

In Fig. 6 there are shown the buffer amplifier and frequency changer Units E and F through which energy from the oscillator in Unit A is supplied to the discriminator Unit G. Unit E also serves as a switch for cutting off the supply of oscillator energy to the discriminator so that no controlling effect will be exerted upon the oscillator by the frequency stabilizer during the intervals when the frequency is deviated. Preferably, the unit operates in conjunction with the oscillator Unit F as a heterodyne frequency changer for the purpose of reducing the frequency of the carrier to one which can more effectively be handled by the discriminator unit. Unit E comprises essentially a pentode amplifier tube 38 with a tuned output circuit 39. To the input grid of this tube are supplied both carrier frequency wave energy from Unit A and negative polarity blanking impulses from Unit K, the latter being adapted to render the amplifier inoperative during the blanking interval. As has already been mentioned, it is desirable that the amplifier should be rendered inoperative shortly before the carrier frequency is shifted in order that there may be no interaction between the video modulated carrier and the deviated carrier or synchronizing signal.

Unit F comprises a crystal-controlled oscillator of conventional form consisting of a triode space discharge device 40, a piezo-electric crystal 41 connected in the grid circuit thereof and a resonant tank circuit 42. The latter may be inductively coupled to a coil 43 in the cathode circuit of the amplifier tube 38. The frequency at which this oscillator operates should be such as will effect a translation of the carrier to a frequency at which the succeeding discriminator unit will operate effectively. For example, in the present instance where the carrier oscillator is intended to operate at 16,812,500 cycles, the heterodyne oscillator, Unit F, may be made to oscillate at a frequency of 16,300 kilocycles so as to give a heterodyned frequency of the order of 500 kilocycles. In the event that there proves to be too much interaction between the heterodyne oscillator and the carrier oscillator, it may be desirable to include a buffer stage of conventional design between the heterodyne oscillator and Unit E. It will, of course, be understood that if a discriminator unit is available which can be made to operate satisfactorily at the frequency of the carrier oscillator, the frequency changing function of Unit E may be omitted, in which case there will be no need for Unit F.

Fig. 7 shows one form of the A. F. C. discriminator, Unit G. This unit is similar to conventional discriminator units such as are used in radio receivers and need be described but briefly. The signal output from Unit E is supplied to the input grid of a pentode amplifier tube 44 whose output impedance is the tuned circuit 45. The latter is inductively coupled to a high impedance link circuit comprising the inductances 46, 47 and 48. It will be noted that the junction point between the inductances 47 and 48 is grounded. The resonant circuits 49 and 50 are coupled to the link circuit through inductances 47 and 48 respectively. These circuits may be tuned respectively to frequencies above and below the frequency supplied from Unit E when the oscillator of Unit A is operating at the desired carrier frequency. Connected effectively in shunt with each resonant circuit for high frequency currents is a series circuit consisting of a diode 51 and a load resistor 52. The path for high frequency currents is completed by the condenser 53, one side of which is connected to the junction between the resonant circuits 49 and 50 which, in turn, is grounded. The load resistors are by-passed by the condensers 54. In shunt with both load impedances is a resistor 55 with grounded center-tap for averaging the D. C. voltages developed across both load impedances. The voltages at opposite ends of this resistor will be equal and opposite when measured with respect to ground and may be applied directly to the grids of the frequency stabilizer tubes of Unit A.

Regarding the operation of the discriminator unit just described, it will be noted that, when the frequency of the signal supplied to the unit from Unit E departs from a frequency midway between the frequencies to which the resonant circuits 49 and 50 are tuned, the high frequency voltage developed across one resonant circuit will exceed that developed across the other. Then the rectified voltage developed across one of the load resistors will differ in magnitude from that developed across the other and a D. C. voltage whose polarity will depend upon the sense in which the signal frequency has drifted will appear across the tapped resistor 55.

Because of the switching action of the tube 38 of Unit E which is brought about by the application of negative blanking pulses to the grid of that tube, the translated oscillator signal will be supplied to the discriminator Unit G only during the intervals c of Fig. 2—A when it is essential to maintain the carrier frequency substantially constant. As was hereinbefore noted, it would be undesirable to permit the controlling action of the frequency stabilizer to continue during the interval in which the carrier frequency is shifted. Hence, by discontinuing the supply of carrier frequency energy from the oscillator to the discriminator during this interval, the discriminator is prevented from developing a control voltage tending to oppose the shift in the carrier frequency. It is, however, desirable that a certain substantially fixed value of control bias voltage be applied to the grids of the frequency stabilizer tubes in order to insure the shift of the carrier frequency by a substantially constant amount during each frequency shift interval d. In view of this, it will now be understood why it is desirable that the time constants of the filter circuits in the connections from the discriminator to the grids of the stabilizer tubes should be kept relatively long by comparison with the duration of the interval d, since by so constructing the filter circuits, the value of bias voltage on the grids of these tubes just before the interval d will be substantially maintained throughout the said interval.

One disadvantage of the prior art discriminator circuit above described is the difficulty of adjusting the resonant frequencies of the circuits 49 and 50. In order to avoid this difficulty, the circuit shown in Fig. 8 may be used. This circuit employs a pentode amplifier 56 with an inductive load 57. Inductively coupled to the load 57 is a tuned circuit 58 to which, in turn, there is coupled a second tuned circuit 59. Both of these may be made resonant to the frequency of the sigal supplied from Unit E when the main oscillator of Unit A is functioning at the desired frequency. A conductive connection is provided between a center tap on the inductance in the first-mentioned resonant circuit 58 and one side of the resonant circuit 59. The other side of the circuit 59 may be grounded through the condenser 60. Connected between each end of the tank circuit 58 and ground is a diode 61 and its associated load resistor 62. The load resistors may be by-passed by condensers 63. As in the case of the discriminator unit shown in Fig. 7, balanced control voltages are taken off across a resistor 64 connected across both load resistors and center-tapped to ground.

In this discriminator the high frequency voltages applied to the rectifier tubes 61 comprise, in each case, the vector sum of the voltage across the circuit 59 plus that developed across one-half of the inductance of the circuit 58. At the common resonant frequency of the two circuits, the voltages thereacross will be 90 degrees out of phase, and the voltages applied to the rectifiers will be equal. As the frequency changes in either sense from that to which the resonant circuits are tuned, the phase relation between the circuit voltages will become more or less than 90 degrees; the magnitudes of the voltages applied to the rectifiers will become unequal and a controlling voltage will be developed.

The above-described circuit is particularly easy to adjust since both resonant circuits are to be tuned to the same frequency and since one side of the circuit 59 is effectively grounded for high frequencies.

Still another form of discriminator adapted for use in the system according to the invention is shown in Fig. 9. This circuit is particularly adapted to give a large amount of control voltage for relatively small changes in frequency. The signal which is fed from Unit E to the grid of a pentode amplifier 65 is then fed through separate channels to the resonant circuits 66 and 67 tuned to the same frequency as in the previously described circuit but with no mutual coupling therebetween. One of the channels comprises a link circuit 68 connected to the tuned output circuit 69 of the pentode 65 and to the tuned input circuit 70 of the pentode amplifier 71. The output of the latter is coupled through its load inductance 72 to the circuit 66. The link circuit 68 includes a piezo-electric crystal 73, the inherent capacity of which may be approximately neutralized by adjusting the condenser 74. By reason of the use of the crystal, the link circuit is exceedingly sharply tuned. Because of this, small changes in the frequency of the signal transmitted thereby will bring about large shifts in the phase of the output signal. At the frequency to which the link circuit is tuned, there will be no shift in phase between the output circuit 69 and the circuit 66. In order to obtain a voltage 90 degrees out of phase with the voltage across the circuit 66, it is merely necessary to shift the phase of the signal appearing across the circuit 69. This may be done by means of a phase shifting network comprising the resistor 75 and condenser 76 connected to the grid of the pentode amplifier tube 77 whose output is in turn coupled to the circuit 67 through the load inductance 78. The signal supplied to each of the rectifier tubes 79 will be the vector sum of the voltages across circuit 67 plus the voltage across one-half of the inductance of the circuit 66. This latter part of the present discriminator for developing the desired D. C. control voltages is the same as that shown in Fig. 8 and need not again be described in detail.

Brief mention has been made of Units H and K and their purpose has been pointed out. These units may take the form of conventional apparatus for generating accurately timed synchronizing and blanking pulses of the desired duration. Since such devices are well known in the art, it is unnecessary to illustrate or describe them in detail.

Referring now to Unit B of Fig. 3, a preferred embodiment thereof is shown in Fig. 10. This unit comprises frequency multiplier stages for raising the frequencies of the carrier and deviated carrier generated by the oscillator of Unit A to the required frequency for transmission, and an amplifier stage coupled to the said stages. Of course, in the event that the oscillator operates at the frequency to be transmitted and little power is required, this unit may be omitted. In the present embodiment, two frequency-doubler stages and one power amplifier are used. The first doubler comprises the tubes 80 connected to the resonant load impedance 81. The second doubler comprises the tubes 82 having their inputs coupled to the load impedance 81 through the resonant circuit 83. The circuits 81 and 83 should be tuned to frequencies in the neighborhood of twice the frequencies of the video and synchronizing carriers as generated by the oscillator of Unit A. For example, in the present embodiment they may be tuned to approximately 33.9 megacycles. By tuning both of these circuits, a suitable wide band coupling circuit may be obtained which is adapted to pass both the video and the synchronizing carriers. The same is true of the resonant output circuit 84 of the second doubler and the resonant input 85 to the amplifier stage which includes the tubes 86. These circuits may be tuned to approximately 67.75 megacycles. The amplifier tubes should, of course, be neutralized, for example, by means of the neutralizing condensers 87 each connected in the conventional manner between the plate of one tube and the grid of the other.

The resonant output circuit of the amplifier which comprises the condenser 88 and the inductance 89 is inductively coupled through the tuned input circuit 90 to the grids of the modulator tubes 91 of Unit C. Video, blanking and synchronizing signals from any suitable sources, such as the pulse generator units H and K, and a conventional television camera tube, are applied to the grids of the modulating tubes via a center tap on the inductance 92 in the resonant input circuit 90 to effect amplitude modulation of the carrier waves during the proper intervals, as hereinbefore designated. The modulator is provided with a tuned output circuit 93 and may be appropriately neutralized through the medium of the condensers 94 in the conventional way.

The delay network shown in Fig. 3 may be required if the delay in the frequency multiplier and R. F. amplifier, Unit B, is sufficient to upset the timing between the effects of the synchronizing and blanking pulses as transmitted through Unit B on the one hand, and as supplied by the video signal source on the other hand. The delay introduced by the delay network may be just that required to restore the correct relations between the signals supplied to Unit C.

If necessary, any number of stages of linear power amplification may be included between the modulator and the transmitting antenna in order to raise the modulated carrier power to the required level for transmission. In the present embodiment, one such stage (Unit D) is included comprising the tubes 95, the resonant input circuit 96 coupled to the modulator output circuit 93, and a resonant output circuit 97. Neutralization of the power amplifier may be effected by means of the condensers 98. The output circuit 97 of the power amplifier may be coupled to the transmitting antenna (not shown) through an open wire line 99 or other suitable signal transfer means commonly used in the art. All of the coupling circuits in the units just described should be sufficiently broadly tuned to pass both the video and the synchronizing carriers and their modulation components.

Although the invention has been described with reference to certain specific embodiments, it will, of course, be understood that it is capable of expression in other physical forms which will occur to those skilled in the art after reading the foregoing description. The scope of the invention is to be subjected only to those limitations imposed by the following claims.

I claim:

1. In a composite modulated carrier wave signal generating system, a carrier wave generator including space discharge means and an associated resonant circuit including reactive elements, a variable reactance device coupled to said circuit and adapted to have its reactance varied by a control voltage, a second variable reactance device coupled to said circuit and adapted to have its reactance varied in response to a second control voltage only when said second control voltage varies and exceeds a particular value, a source of a control voltage coupled to said first variable reactance device and adapted to vary the reactance thereof so as to maintain the frequency of the generated carrier wave substantially constant during periodically recurring intervals of predetermined duration, a source of a second control voltage coupled to said second variable reactance device, said second control voltage exceeding said particular value only during portions of the intervals separating said first intervals, and means for modulating the amplitude of the carrier wave output of said generator during said first intervals.

2. In a composite modulated carrier wave signal generating system, a carrier wave generator including space discharge means and an associated resonant circuit including reactive elements, variable reactance means coupled to said circuit and adapted to be varied so as to maintain the frequency of the generated carrier wave substantially constant during periodically recurring intervals of predetermined duration, a second variable reactance device coupled to said circuit and adapted to have its reactance varied in response to a control voltage only when said control voltage varies and exceeds a particular value, a source of a control voltage coupled to said last-mentioned variable reactance device, said voltage exceeding said particular value only during portions of the intervals separating said first intervals, and means for modulating the amplitude of the carrier wave output of said generator during said first intervals.

3. In a composite modulated carrier wave signal generating system, a carrier wave generator including space discharge means and an associated resonant circuit including reactive elements, a variable reactance device coupled to said circuit and adapted to have its reactance varied by a control voltage, a second variable reactance device coupled to said circuit and adapted to have its reactance varied in response to a second control voltage only when said second control voltage varies and exceeds a particular value, a source of a control voltage coupled to said first variable reactance device and adapted to vary the reactance thereof so as to maintain the frequency of the generated carrier wave substantially constant during periodically recurring intervals of predetermined duration, a source of a second control voltage coupled to said second variable reactance device, said second control voltage exceeding said particular value only during portions of the intervals separating said first intervals, means for effectively disconnecting said first source from said first variable reactance device during the interval separating said first intervals, and means for modulating the amplitude of the carrier wave output of said generator during said first intervals.

4. In a composite modulated carrier wave signal generating system, a carrier wave generator including space discharge means and an associated resonant circuit including reactive elements, an automatic frequency control discriminator supplied with signal from said generator, an automatic frequency control tube having its output coupled to said resonant circuit and being supplied with control bias voltage developed by said discriminator, thereby to control the frequency of said generator, means for effectively disconnecting said discriminator from said generator during periodically recurring intervals, a variable reactance device coupled to said resonant circuit and adapted to have its reactance varied in response to a control voltage only when said control voltage varies and exceeds a particular value, a source of a control voltage coupled to said device, said control voltage exceeding said particular value only during said intervals, and means for modulating the amplitude of the carrier wave output of said generator during the intervals separating said first intervals.

5. In a composite modulated carrier wave signal generating system, a carrier wave generator including space discharge means and an associated resonant circuit including reactive elements, an automatic frequency control discriminator supplied with signal from said generator, an automatic frequency control tube having its output coupled to said resonant circuit and being supplied with control bias voltage developed by said discriminator, thereby to control the frequency of said generator, means for effectively disconnecting said discriminator from said generator during periodically recurring intervals, a variable reactance device associated with said resonant circuit, said device comprising a pair of triode space discharge devices having their cathodes connected together and having their anodes connected across a portion of said resonant circuit, means for applying to the respective grids of said space discharge devices out-of-phase voltages in phase quadrature with and of the same frequency as the voltage appearing across said resonant circuit, means for applying control signal in the same phase to the grids of both of said space discharge devices, said control signal being such as to cut-off said space discharge devices during said intervals but to render them conducting during the intervals separating said first intervals.

6. In a composite modulated carrier wave signal generating system, a carrier wave generator including space discharge means and an associated resonant circuit including reactive elements, an automatic frequency control discriminator supplied with signal from said generator, an automatic frequency control tube having its output coupled to said resonant circuit and being supplied with control bias voltage developed by said discriminator, thereby to control the frequency of said generator so as to maintain it substantially constant, means for modulating the amplitude of the carrier wave output of said generator during periodically recurring intervals of relatively longer duration than the intervals separating said first-named intervals, means for effectively disconnecting said discriminator from said generator during said shorter intervals, controllable space discharge means coupled to said resonant circuit for effectively providing a controllable variable reactance in said resonant circuit, and means for causing said reactance to increase during a portion of each of said shorter intervals to thereby produce a shift in the frequency of the carrier wave produced by said generator.

7. In a composite modulated carrier wave signal generating system, a carrier wave generator including space discharge means and an associated resonant circuit including reactive elements, an automatic frequency control discriminator supplied with signal from said generator, an automatic frequency control tube having its output coupled to said resonant circuit and being supplied with control bias voltage developed by said discriminator, thereby to control the frequency of said generator so as to maintain it substantially constant, means for modulating the amplitude of the carrier wave output of said generator during periodically recurring intervals of relatively longer duration than the intervals separating said first-named intervals, means for effectively disconnecting said discriminator from said generator during said shorter intervals, controllable space discharge means coupled to said resonant circuit for effectively providing a controllable variable reactance in said resonant circuit, means for causing said reactance to increase during a portion of each of said shorter intervals to thereby produce a change in the frequency of the carrier wave produced by said generator, and separate means for producing amplitude modulation during at least certain of said intervals.

8. In a composite carrier wave signal generating system, a carrier wave generator including space discharge means and an associated parallel resonant circuit including reactive elements and adapted to determine the frequency of the generated carrier wave, an automatic frequency control discriminator supplied with signal from said generator, an automatic frequency control tube having its output circuit coupled to said resonant circuit and being supplied with control bias voltage developed by said discriminator, thereby to control the frequency of said generator so as to maintain it substantially constant, means for modulating the amplitude of the carrier wave output of said generator during periodically recurring intervals of substantially constant duration, means for effectively disconnecting said discriminator from said generator during the intervals separating said first intervals, said second intervals being of relatively shorter duration than said first intervals, controllable space discharge means having its output circuit connected in shunt with said parallel resonant circuit for effectively providing a controllable variable reactance in shunt therewith, and means for causing said reactance to change during a portion of each of said shorter intervals to thereby produce a change in the frequency of the carrier wave produced by said generator, said portion being of shorter duration than said shorter intervals and being so timed with reference thereto that intervals obtain at the beginning and at the end of each of said shorter intervals during which said generated carrier wave is changed neither in amplitude nor in frequency except as a result of transients set up in said system.

9. In a composite carrier wave signal generating system, a carrier wave generator including space discharge means and an associated parallel resonant circuit including reactive elements and adapted to determine the frequency of the generated carrier wave, an automatic frequency control discriminator supplied with signal from said generator, an automatic frequency control tube having its output circuit coupled to said resonant circuit and being supplied with control bias voltage developed by said discriminator, thereby to control the frequency of said generator so as to maintain it substantially constant, means for modulating the amplitude of the carrier wave output of said generator during periodically recurring intervals of substantially constant duration, means for effectively disconnecting said discriminator from said generator during the intervals separating said first intervals, said second intervals being of relatively shorter duration than said first intervals, resistance-capacitance filter means having a time constant large by comparison with the duration of said shorter intervals interposed between said discriminator and said control tube, controllable space discharge means having its output circuit connected in shunt with said parallel resonant circuit for effectively providing a controllable variable reactance in shunt therewith, and means for causing said reactance to increase during a portion of each of said shorter intervals, thereby to effect a shift in the frequency of the carrier wave produced by said generator, said portion being of shorter duration than said shorter intervals and being so timed with reference thereto that intervals obtain at the beginning and at the end of each of said shorter intervals during which said generated carrier wave is changed neither in amplitude nor in frequency except as a result of fortuitous transients set up in said system.

10. In a composite modulated carrier wave signal generating system, a carrier wave generator including space discharge means and an associated resonant circuit including reactive elements, an automatic frequency control discriminator supplied with signal from said generator, an automatic frequency control tube having its output coupled to said resonant circuit and being supplied with control bias voltage developed by said discriminator, thereby to control the frequency of said generator, a source of periodically recurring pulse signals, means coupled to said source and responsive to said pulse signals for effectively disconnecting said discriminator from said generator during the occurrence of each pulse signal, a variable reactance device coupled to said resonant circuit and adapted to have its reactance varied in response to a control signal only when said control signal varies and exceeds a particular value, a second source of periodically recurrent pulse signals coupled to said device, said last-mentioned signals occurring contemporaneously with but being of shorter duration than said first pulse signals and exceeding said particular value whereby they are effective to produce a change in the reactance of said device effective throughout the duration of each pulse signal, and means for modulating the amplitude of the carrier wave output of said generator at least during the intervals between said first pulse signals.

11. In a composite modulated carrier wave signal generating system, a carrier wave generator including space discharge means and an associated resonant circuit including reactive elements, an automatic frequency control tube having its output coupled to said resonant circuit and adapted to control the frequency of said generator in response to a control bias voltage, an automatic frequency control discriminator, means coupled to the output of said carrier wave generator and adapted to translate the signal therefrom by heterodyning to a frequency at which said discriminator operates efficiently, means for supplying the translated signal from said last means to said discriminator to cause the latter to develop a control voltage varying with the frequency of said translated signal, means for supplying the control voltage produced by said discriminator to said control tube to control the frequency of said generator, means for modulating the amplitude of the carrier wave output of said generator during periodically recurring intervals, means for interrupting the supply of said translated signal to said discriminator during the intervals separating said first intervals, said second intervals being of relatively shorter duration than said first intervals, a controllable variable reactance device coupled to said resonant circuit, and means for causing the reactance of said device to increase during a portion of each of said shorter intervals to thereby produce a shift in the frequency of the carrier wave produced by said generator.

12. In a composite modulated carrier wave signal generating system, a carrier wave generator adapted to have its frequency controlled, means for maintaining the frequency of the generated carrier wave substantially constant during periodically recurring intervals of relatively long duration separated from each other by intervals of relatively shorter duration, means for substantially shifting the frequency of said carrier during a portion of each of said shorter intervals, means for rendering said frequency-maintaining means inoperative during the operation of said last-named means, means for multiplying the frequency of the carrier wave output of said generator by a constant factor, and means for modulating the amplitude of the frequency-multiplied signal at least during said intervals of longer duration.

13. In a system for generating a composite modulated carrier wave television signal containing both video and synchronizing intelligence, a carrier wave generator adapted to have its frequency controlled, means for maintaining the frequency of the generated carrier wave substantially constant during periodically recurring intervals of relatively long duration separated from each other by intervals of relatively shorter duration, a source of periodically recurring synchronizing pulses, said pulses being so timed that each occurs during one of said shorter intervals, means supplied with said synchronizing pulses and responsive thereto for shifting the frequency of said carrier, means for rendering said frequency-maintaining means inoperative during the operation of said last-named means, means for multiplying the frequency of the carrier wave output of said generator by a constant factor, a source of video signal, and means for causing said video signal to modulate the amplitude of the frequency-multiplied carrier signal during said intervals of longer duration.

14. In a generator of a wave signal of controllable frequency, an oscillator comprising at least a pair of push-pull connected space discharge devices and a resonant tank circuit connected between the anodes of said space discharge devices, a circuit associated with said oscillator for automatically maintaining the frequency of said oscillator substantially constant during periodically recurring intervals, a second pair of space discharge devices, each having an anode, a cathode, and a control grid, the anode of each said second space discharge devices being connected to the anode of one of said first-mentioned space discharge devices, and there being a connection between said cathodes, means for applying to the grid of each of said second space discharge devices a voltage of the same frequency as that generated by said oscillator, the voltage applied to one of said grids being opposite in phase to that applied to the other grid and being in phase quadrature with the voltage on the anode of the corresponding space discharge device, and means for applying to the grids of said second space discharge devices bias voltages varying in the same phase and in such a manner as to maintain said space discharge devices cut-off during said intervals and to render them conducting during a portion of the time between each interval, whereby, when said space discharge devices are conducting, they are effective to modify the reactance of said tank circuit and to cause a change in the frequency of said oscillator.

15. In a system for generating a composite modulated carrier wave, a carrier wave generator adapted to have its operating frequency varied, means for automatically maintaining the operating frequency of said generator substantially constant, means for rendering said last-named means inoperative during periodically recurring time intervals separated by other intervals, means for varying the operating frequency of said generator during the first-mentioned intervals, and means for modulating the amplitude of at least those portions of the generated carrier wave occurring during said other intervals when the frequency of said wave is substantially constant.

16. In a system for generating a composite modulated carrier wave, means for generating a carrier wave whose frequency is adapted to be varied, means for automatically maintaining the frequency of said carrier wave substantially constant, means for rendering said last-named means operative only during periodically recurring time intervals separated by other intervals, means for varying the frequency of said carrier wave during said other intervals, and means for modulating the amplitude of the carrier wave at least during said first-mentioned intervals when the frequency of said wave is substantially constant.

17. In a television system in which the video signal and synchronizing intelligence are transmitted during different predetermined time intervals, means for generating a carrier wave, means for modulating said wave with the video signal during the video signal intervals, means for automatically maintaining the frequency of said wave constant during the video signal intervals, means for changing the frequency of said wave during the synchronizing intervals, and means for rendering said frequency-maintaining means inoperative during the synchronizing intervals.

18. In a television transmitting system in which synchronizing intelligence is transmitted during periodically recurring synchronizing intervals, a carrier wave generating means adapted to have its operating frequency varied, means including a frequency stabilizer for automatically maintaining the operating frequency of said generating means substantially constant, means including a frequency shifter for shifting the operating frequency of said generating means during said synchronizing intervals, and means for rendering said stabilizing means inoperative during said synchronizing intervals.

19. In a television transmitting system in which synchronizing intelligence is transmitted within predetermined blanking intervals during which the video signal is blanked out, means for generating a carrier wave, means for modulating said wave with the video signal, frequency-control means for automatically maintaining the frequency of said wave substantially constant, a source of blanking impulses, means for utilizing said impulses to blank out the video signal during the blanking intervals, additional means for utilizing said impulses to render said frequency-control means inoperative during the blanking intervals, and means for changing the frequency of said wave during at least a part of each blanking interval to transmit synchronizing intelligence.

20. In a television transmitting system in which synchronizing intelligence is transmitted within predetermined blanking intervals during which the video signal is blanked out, means for generating a carrier wave, means for modulating said wave with the video signal, frequency-control means for automatically maintaining the frequency of said wave substantially constant, a source of blanking impulses, a source of synchronizing impulses each occurring within the duration of a blanking impulse, means for utilizing said blanking impulses to blank out the video signal during the blanking intervals, additional means for utilizing said blanking impulses to render said frequency-control means inoperative during the blanking intervals, and means operable by said synchronizing impulses for changing the frequency of said wave, thereby to transmit synchronizing intelligence.

21. In a television transmitting system in which the video signal and synchronizing intelligence are transmitted during different predetermined time intervals, a carrier wave generator and frequency control unit comprising an oscillator, a frequency shifter and a frequency stabilizer both connected to said oscillator and adapted to vary the frequency thereof, means responsive to frequency variations of the oscillator output for operating said frequency stabilizer so as to maintain the oscillator frequency substantially constant during the video signal intervals, means for amplitude-modulating the carrier wave with the video signal during said intervals, and means for operating said frequency shifter so as to change the oscillator frequency during the synchronizing intervals to thereby transmit the synchronizing intelligence.

DAVID B. SMITH.